April 5, 1960  L. R. SCHUESSLER  2,931,667
BOOKKEEPING UNITS
Filed Aug. 14, 1957  4 Sheets-Sheet 1

INVENTOR
LEVYN R. SCHUESSLER
BY Cohn and Powell
ATTORNEYS

April 5, 1960  L. R. SCHUESSLER  2,931,667
BOOKKEEPING UNITS
Filed Aug. 14, 1957  4 Sheets-Sheet 2
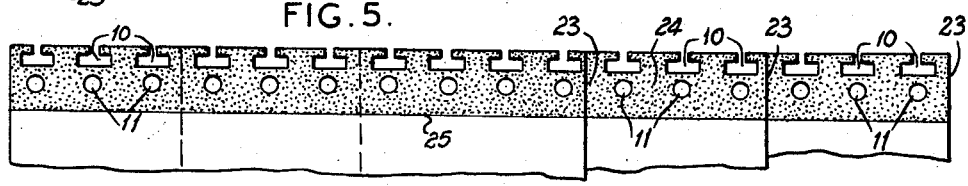
INVENTOR
LEVYN R. SCHUESSLER
BY Cohn and Powell
ATTORNEYS April 5, 1960  L. R. SCHUESSLER  2,931,667
BOOKKEEPING UNITS
Filed Aug. 14, 1957  4 Sheets-Sheet 3
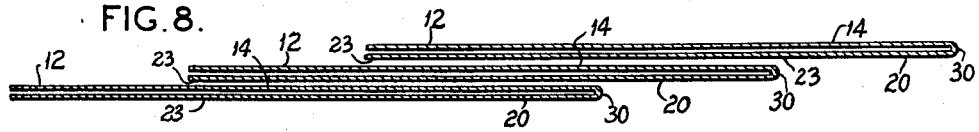
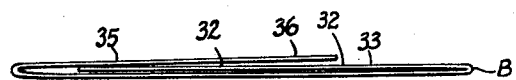
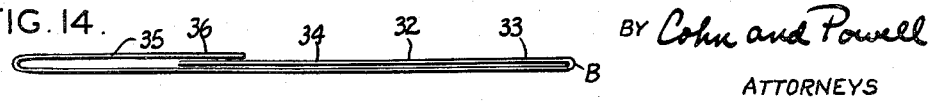
INVENTOR
LEVYN R. SCHUESSLER
BY Cohn and Powell
ATTORNEYS April 5, 1960     L. R. SCHUESSLER     2,931,667
BOOKKEEPING UNITS
Filed Aug. 14, 1957     4 Sheets-Sheet 4

INVENTOR
LEVYN R. SCHUESSLER
BY Cohn and Powell
ATTORNEYS

United States Patent Office 2,931,667
Patented Apr. 5, 1960

2,931,667

BOOKKEEPING UNITS

Levyn Ray Schuessler, University City, Mo.

Application August 14, 1957, Serial No. 678,062

6 Claims. (Cl. 283—66)

This invention relates generally to improvements in bookkeeping units, and more particularly to an improved arrangement and assembly of specific general ledger sheets to provide a continuous up to date general ledger.

It is an important object of the present invention to provide general ledger sheets having columns arranged in sections relating to certain business categories, i.e., category involving current accounting period entries (usually a monthly period), and a category involving year-to-date entries, and having special columns of these sections arranged on the sheets so that the sheets can be disposed in a bookkeeping unit or units for the categories which reflect a continuous, up to date vertical general ledger.

Another important objective is achieved by the specific arrangement of different category sections on the general ledger sheets so that sheets can be arranged in a bookkeeping unit with special columns exposed so that the year-to-date figures shown on the year-to-date section of the preceding month can be added to those of the current month section and the answers entered on the year-to-date section of the current month, and of course balanced.

Still another important object is realized by the arrangement of columns in a year-to-date section which enables the totals of transactions of each period to be kept separate, and enables adjusting entries that effect a prior accounting period, either month or year, to be brought into the record at any time without commingling or intermingling. Other advantages are realized in that sheets can be arranged in units as described above with special columns of the year-to-date section and current accounting period sections exposed in side by side relation to provide an up to date general ledger.

Yet another important object is provided by the particular arrangement of columns in current period sections on the sheets and the arrangement of such sheets in bookkeeping units so that the sheet for any month may be rewritten to correct errors of commission or omission, and such rewritten sheet placed over the other sheet in order to provide a complete ledger.

Another object is realized in that the sheets can be provided selectively with anchor strips to preclude unintentional removal of the sheets from a bookkeeping unit in a ring binder. Other sheets may be provided with a glue strip on the back side to hold the sheets in an assembled unit and accurately locate the various columns.

Another important object is achieved in providing each ledger sheet with a position-alignment stub portion having a predetermined width so that the sheets may be assembled in predetermined order in the bookkeeping unit to assure that special columns will be located in exposed side by side relation in binders where the distance between rings is other than a whole number product or quotient of the width of such special columns.

Another object is realized in providing a particular arrangement of the business category sections on a single sheet and in providing fold lines located particularly relative to such sections which enable the sheet to be used in convenient bookkeeping units of the type mentioned above.

The foregoing and numerous other objects and advantages of the invention will more clearly appear from the following detailed description of detailed preferred embodiment, particularly when considered in connection with the accompanying drawings, in which:

Fig. 3 is a top plan view of a bookkeeping unit, shown partially cut away, of a plurality of general ledger sheets each having a column section relating to the current period category;

Fig. 4 is a cross sectional view of the unit as seen along line 4—4 of Fig. 3;

Fig. 5 is a rear plan view of the upper portion of the unit shown in Fig. 3;

Fig. 6 is a top plan view of a bookkeeping unit utilizing a combination of general ledger sheets having sections relating to year-to-date and current accounting period categories;

Fig. 7 is a top plan view, partially cut away, of a bookkeeping unit utilizing general ledger sheets which carry column sections relating to both year-to-date category and current period category;

Fig. 8 is a cross sectional view of the unit shown in Fig. 7 as seen along line 8—8;

Fig. 9 is a reduced top plan view of a general ledger sheet utilizing column sections relating to year-to-date category and to current period category;

Fig. 10 is a cross sectional view of the sheet shown in Fig. 9 when folded for assembly in a bookkeeping unit;

Fig. 11 is a top plan view of the general ledger sheet shown in Fig. 9 when folded into another bookkeeping unit to facilitate posting of year-to-date totals;

Fig. 12 is a bottom end view of the general ledger sheet shown in Fig. 11;

Fig. 13 is a bottom end view of the general ledger sheet shown in Fig. 11, similar to that shown in Fig. 12 but with a slightly different folding arrangement, and Fig. 14 is a bottom end view of the general ledger sheet shown in Fig. 11, similar to that shown in Figs. 12 and 13 but with the sheet folded again in a slightly different arrangement.

Figures 1, 2:
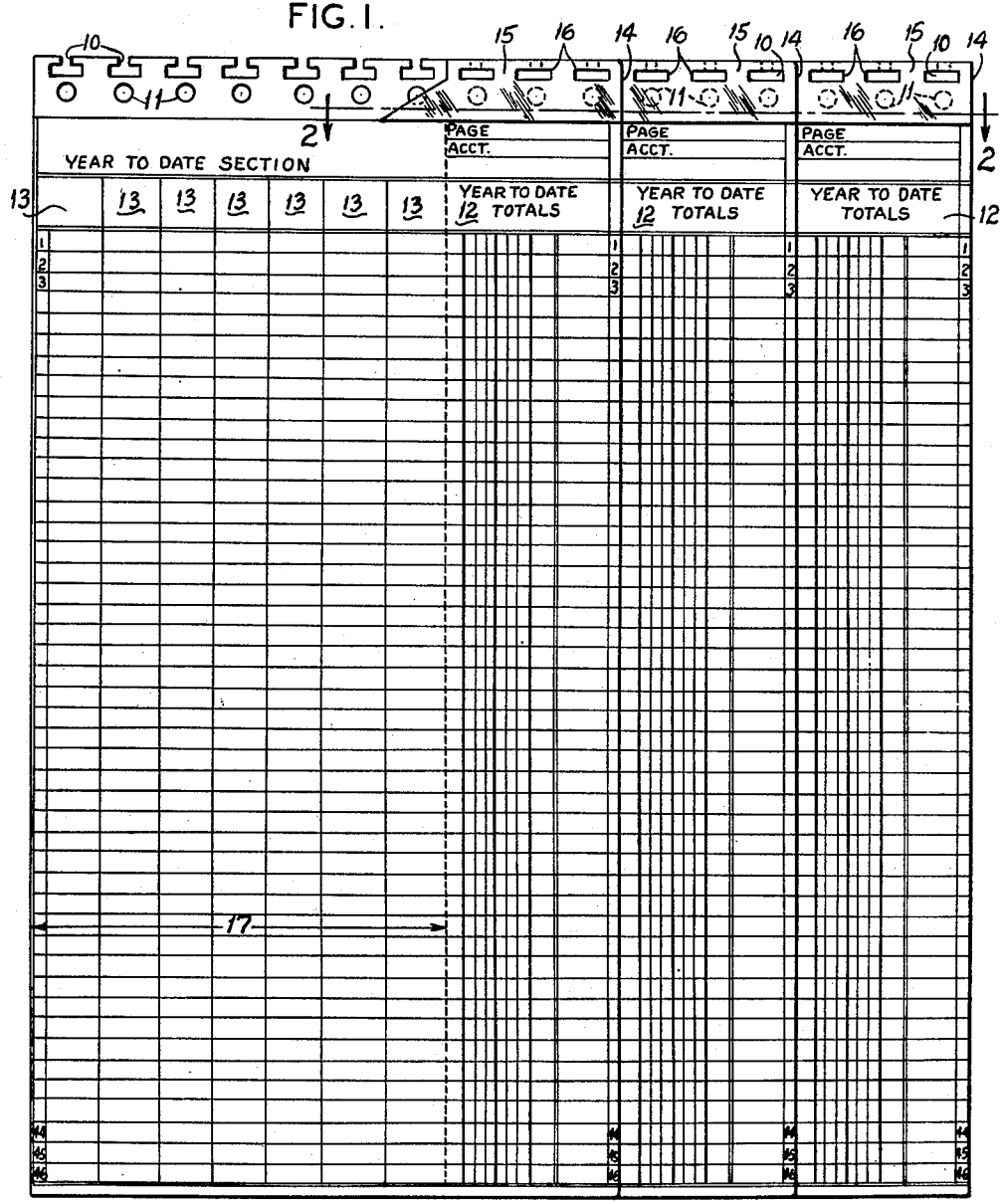
Fig. 1 is a top plan view of a bookkeeping unit utilizing ledger sheets having a column section relating to the year-to-date category.
Fig. 2 is a cross sectional view of the unit shown in Fig. 1 as seen along line 2—2.

Referring now by characters of reference to the drawings, and first to Figs. 1 and 2, in which a bookkeeping unit is shown utilizing a plurality of vertical general ledger sheets. Each of the ledger sheets 14 shown in Figs. 1 and 2 is punched along its uppermost margin to provide inverted T-shaped binder apertures 10 and a plurality of pegboard holes 11. Each of the sheets 14 is provided with a plurality of columns arranged in a section relating to the category involving year-to-date entries. At one side (right hand side Fig. 1) of the year-to-date section there is provided a special column 12 adapted to receive entries relating to year-to-date totals, the year-to-date totals column 12 constituting the right hand edge of the ledger sheet. The plurality of columns constituting the remainder of the year-to-date section at the left of the year-to-date totals column 12 are adapted to receive adjusting entries that affect a prior accounting period, either month or year, which may be brought into the record at any time without commingling or intermingling as will be described subsequently. It will be noted that each line of the general ledger sheet 14 is numbered, and that on the year-to-date section of the ledger sheet the line numbers are provided along the right edge of the year-to-date totals column 12. The line numbers facilitate posting since they are also a part of the account numbers.

One year-to-date section general ledger sheet 14 is provided for each month which is the usual accounting period. The year-to-date section sheets 14 are arranged in super-imposed relation, one on top of the other as perhaps more clearly shown in Fig. 2. When arranged in the bookkeeping unit shown in Figs. 1 and 2 the year-to-date sheets 14 are arranged in laterally offset relation so that the year-to-date totals columns 12 are disposed in exposed side by side relation as seen best in Fig. 1. It is possible with this unit arrangement that the current year-to-date totals can be ascertained at a glance as well as the year-to-date totals for any particular accounting month.

If the distance between the binder apertures 10 is divisible by a whole number into the width of the year-to-date totals column 12, then that portion of the sheet from the left hand edge to the left hand edge of the year-to-date totals column 12, which will hereinafter be referred to as the position-alignment stub portion 17, of each sheet is equal. However, where the distance between the binder apertures 10 is other than a whole number product or quotient of the width of the year-to-date totals column 12, then the width of the position-alignment stub 17 of each sheet 14 must be predetermined in order to have the year-to-date totals columns 12 arranged in side by side relation as shown in Figs. 1 and 2. In such case, the position-alignment stub 17 of each sheet differs from the width of the adjacent underlying sheet, when the quotient of the division of the distance between the binder apertures 10 into the width of the year-to-date totals column 12 is other than a whole number, by an amount equal to the remainder of such division for a number of successive sheets equal to the quotient in order to align the columns 12 in exposed side by side relation.

For example, if the distance between binder apertures were 9/16 inch and the width of the year-to-date totals column 12 was 30/16 inch, then the width of the position-alignment stub 17 of the second sheet 14 in the bookkeeping unit shown in Fig. 1 would be 3/16 inch wider than the position-alignment stub 17 of the overlying sheet, and the position-alignment stub 17 of the third sheet would be 3/16 of an inch wider than the second sheet. The fourth sheet in such unit would have the position-alignment stub 17 the same width as the first sheet.

If desired, the general ledger sheets 14 may be anchored in a binder when assembled in the bookkeeping unit illustrated in Figs. 1 and 2. An anchor strip 15 is glued to the upper right hand corner of the sheet, the strip 15 being provided with a plurality of enclosed apertures 16 which are alignable with corresponding binder apertures 10 formed on the ledge sheet. When glued in position, the anchor strips 15 preclude removal of the sheets from the binder. Moreover, the margins defining apertures 16 in anchor strips 15 engage the binder rings or fasteners extending through binder apertures 10 and strip apertures 16 so as to align the horizontal lines of the sheets in alignment in the bookkeeping unit.

Other vertical general ledger sheets 23 are provided with a plurality of columns arranged in a section involving a category related to current accounting period entries. These current period ledge sheets 23 are provided with corresponding binder apertures 10 and pegboard holes 11 along their upper margins as illustrated in Fig. 3 similar to the year-to-date sheets shown in Fig. 1. The special totals column 20 located at one side of the current period section is adapted to receive current period totals, the current period totals column 20 being disposed along the right hand side of the ledge sheet. That portion of the current period section from the left hand side of the sheet to the left hand side of the current period totals column 20 constitutes a position-alignment stub 21 which corresponds to the position-alignment stub 17 of the previously described year-to-date ledger sheet 14.

The current period section includes a plurality of distributive columns 22 to the left of the current period totals column 20, which are headed with the source of the entries, as for example: cash receipts; cash disbursed; voucher checks; general journal entries; purchase journal; sales journal and so on. To facilitate posting in the current period sections of the ledger sheet 23, each line is numbered as illustrated in Fig. 3, the line numbers being provided along the left hand edge of each current period totals column 20.

The current period ledger sheets 23 are conveniently assembled in superimposed relation one on top of the other as illustrated in Figs. 3 and 4, and the sheets 23 are arranged in laterally offset relation so that the current period totals columns 20 of the sheets are arranged in exposed side by side relation. When located in this bookkeeping unit, the net change or result of any month can be ascertained at a glance at the current period totals column 20 of any particular month or other accounting period.

If desired, the current period ledger sheets 23 may be held together in the assembled unit shown in Fig. 3. To realize this result the upper margin of each sheet is provided with a glue strip 24 at the back side of the sheet, as is more clearly shown in Figs. 4 and 5. Preferably, the glue strip 24 is located immediately above a horizontal fold line 25 located above the columns of the current period section and below the binder apertures 10 and pegboard holes 11. In order to attach the sheets 23, the glue strip 24 is moistened and adhered to the underlying sheet 23. If the columns of the underlying sheet need be viewed at any time, the overlying sheet may be folded upwardly about fold line 25, thus making each sheet 23 in the assembly readily accessible even though secured together.

Of course, the glue strip feature described above with respect to the unit utilizing current period ledger sheets 23 may be conveniently utilized with the bookkeeping units utilizing the year-to-date ledger sheets described above with respect to Fig. 1 and subsequently described and shown in Fig. 7.

In utilizing the year-to-date ledger sheets 14 and the current period ledger sheets 23, the distributive columns 22 of the current period section are posted and balanced, after which all entries are crossfooted into the right hand edge current period totals column 20 are balanced. Then, entries effecting a prior period, if any, are posted to the distributive columns 13 of the year-to-date section provided on year-to-date ledger sheet 14, and such entries are balanced.

Thereafter, the year-to-date sheets 14 that are to reflect the balances and totals at the end of the current period, as for example, at the end of a month, are placed on a pegboard at the extreme right of bookkeeping unit shown in Fig. 6. In this bookkeeping unit a current accounting period ledge sheet 23 is placed thereover in superimposed relation, with the current period totals column 20 located immediately at one side (to the left of Fig. 6) of the year-to-date totals column 12 of the underlying ledger sheet 14. Then, the last month's year-to-date ledger sheet 14 is placed thereover in position to crossfoot, the year-to-date totals column 12 of this last mentioned ledger sheet being located immediately to the left of the current period totals column 20 of the underlying current period ledger sheet 23. When the ledger sheets 14 and 23 are assembled in the bookkeeping unit disclosed by Fig. 6, the year-to-date figures of the preceding month are added to those of the current accounting period or month found in current period totals column 20 and the answers are entered in the year-to-date totals column 12 of the year-to-date sheet 14 of the current month, and of course are balanced.

If for example there were adjusting entries made in the distributive columns 13 of the year-to-date section of the year-to-date sheet 14 of the current month, then the overlying current accounting period sheet 23 of this bookkeeping unit Fig. 6 would be offset to such an extent to expose such distributed columns 13 so that such adjusting entries may be taken into account in providing a balanced year-to-date ledger sheet 14 of the current month. This particular arrangement is not shown in the drawing, but it is considered obvious from Fig. 6 if the current period ledger sheet 23 and overlying year-to-date ledger sheet 14 were moved laterally to the left to such an extent to expose such distributive columns 13 of the underlying year-to-date ledger sheet 14.

It is seen that in each of the above described bookkeeping units shown in Figs. 1, 3 and 6 that the special columns, i.e. the year-to-date totals column 12 and the current period totals column 20 are of the same width.

Figs. 7 and 8 show a bookkeeping unit utilizing the same year-to-date and current accounting period sections previously described. It is seen from Figs. 7 and 8 that each ledger sheet of the unit is provided with a vertical center fold line 30, the sheet being provided at one side of the fold line 30 with a plurality of columns arranged in a section relating to a category involving year-to-date entries identical to the section shown in Fig. 1, the special totals column relating to year-to-date totals 12 being located adjacent fold line 30. The sheet is provided at the other side of fold line 30 with a plurality of columns arranged in a section relating to a category involving current accounting period entries identical to the section shown in Fig. 3 previously described. Again, the special column, that is the column relating to current period totals 20, is located adjacent the side end of the sheet. It will be noted that the width of the current period totals column 20 and the year-to-date totals column 12 are equal. When the ledger sheet shown in Figs. 7 and 8 is folded, the current period section will appear on one side and the year-to-date section will appear on the opposite side. The sheets (Figs. 7 and 8) may be located in superimposed relation one on top of the other in laterally offset relation to expose the special columns 12 or 20 when viewed from opposite sides of the bookkeeping unit as seen in Figs. 1 and 3 respectively.

Of course it will be apparent that the bookkeeping unit shown in Figs. 7 and 8 may be comprised of separate current period section ledger sheets 23 arranged in back to back relation with corresponding year-to-date section ledger sheets 14 instead of having such sections arranged on a single ledger sheet as previously described with respect to Figs. 7 and 8. In this arrangement, each pair of current period section ledger sheets 23 and year-to-date section ledger sheet 14 that is arranged in back to back relation may be conveniently secured together along one edge so as to hold such sheets in alignment.

When the ledger sheets 14 and 23 are arranged in back to back relation as described above with respect to Figs. 7 and 8, the current period totals column 20 of any particular accounting period or month may be studied and viewed from one side of the bookkeeping unit. Similarly, if it is desired to study the year-to-date totals column 12 for any particular accounting period, the unit may be conveniently flipped over in the binding book and viewed from the opposite side by turning the binding book.

Fig. 9 shows a vertical general ledger sheet 31 on which are provided the year-to-date column section relating to the category involving year-to-date entries and also the current period column section involving the category for current period entries. The ledger sheet 31 is divided into three equal width portions as defined by fold lines A and B. The sheet portion from the left hand edge (Fig. 9) to the fold line B is provided with a plurality of columns arranged in a section 32 relating to a category involving year-to-date entries, such section 32 being similar to the year-to-date section shown on ledger sheet 14 of Fig. 1. This year-to-date section 32 includes a year-to-date totals column 33 that is arranged immediately adjacent the fold line B at one side of such section. Further, the year-to-date section 32 includes a plurality of distributive columns 34 which are adapted to receive adjustment of prior periods, either of the prior accounting period as for example the prior month, or totals of transactions effecting the prior year. Naturally, such distributive columns 34 are headed to show the period or reasons for entries made therein.

That portion of ledger sheet 31 from the right hand edge (Fig. 9) to the fold line A is provided with a plurality of columns arranged in a section 35 relating to a category involving current accounting period entries. This current period section 35 is similar to the columns shown on the ledger sheet 23 disclosed in Fig. 3 and discussed previously. For example, the current period section 35 includes a current period totals column 36 located at one side of the section and located immediately adjacent the right hand edge of the ledger sheet 31. The remaining columns 37 to the left of the current period totals column 36 extending to the fold line A are distributed columns adapted to receive entries effecting the current period as for example, cash receipts, cash disbursed, general entries, sales journal entries, purchase journal entries, and so on.

The portion of ledger sheet 31 between fold lines A and B is provided with a plurality of columns 39 arranged in another current period section 38, the columns 39 of which are additional distributive columns similar to distributive columns 37. These additional distributive columns 39 are available if and when the need arises.

After entries in the year-to-date section 32, in the current period section 33, and in the additional current period section 38, the ledger sheet 31 is folded as shown in Fig. 10 along fold lines A, B, and C, the fold line C being preferably located at the center of ledger sheet 31. When the ledger sheet 31 is folded as illustrated in Fig. 10, the sheet may be assembled in a binder book in superimposed relation one on top of the other and in laterally offset relation similarly to the bookkeeping unit disclosed in Fig. 7 to expose the special columns 33 and 36. In this bookkeeping unit, the year-to-date section 32 is visible from one side and the current period section 35 is visible from the opposite side. To obtain the arrangement shown in Fig. 10, the sheet 31 of Fig. 9 is folded forwardly about fold line C and then folded rearwardly about each of fold lines A and B.

It will be particularly noted that the width of the additional current period section 38 between fold lines A and B may be twice the width of either year-to-date section 32 or current period section 35 in a slightly modified structure but no greater than twice such width because the V-shaped portion of Fig. 10 would then extend beyond the edges of sections 32 and 35 and interfere with the overlapping arrangement of the sheets when disposed in superimposed offset relation, and thus obstruct the view of the special columns 33 and 36.

The ledger sheet 31 of Fig. 9 may be folded as show in Fig. 11 to facilitate entries in the year-to-date totals column 33. For example, the ledger sheet 31 is folded rearwardly about fold line B so that the year-to-date section 32 is face up. Then, the other end of the sheet 31 is folded forwardly so that the current period section 35 is face up and located immediately adjacent the year-to-date totals column 33. Preferably, if there are no entries in the distributive columns 34 of the year-to-date section, the current period totals column 36 is located immediately along the left hand edge of the year-to-date column 33. After the entries in the distributive columns 37 and 39 are balanced and crossfooted into the current period totals column 36, the ledger sheet of last month's year-to-date section is placed overlying the current period section 35 with the year-to-date totals column immediately to the left of the current period totals column 36. Thereafter, the year-to-date figures of the preceding month are added to those of the current month and the answers are entered on the year-to-date totals column 33 of the current month and of course balanced.

If for example there were any adjusting entries effecting transactions of any preceding accounting period of the same year or of the prior year, such entries would be made in distributive columns 34. Depending upon the number of entries the current period section 35 is folded at different places as illustrated in Figs. 12, 13 and 14 in order to place the current period totals column 36 immediately to the left of the columns 34 utilized for adjusting entries. This arrangement enables the adjusting entries to be taken into account and placed into the record without commingling or intermingling.

Each of the above described bookkeeping units permits the ledger sheet for any particular month in which errors of commission or omission are discovered to be rewritten and superimposed over the incorrect ledger sheet, and at the end of each year, the ledger sheet showing "before closing figure" may be covered by the ledger sheet showing the "after closing figures." There is no other mechanical means for completely keeping separate the transactions of each period and of bringing into the records at any time, without intermingling or commingling, any adjusting entries that effect any prior period.

Of course, the use of the anchor strip 15 and the glue strip 24 and of the position-alignment stub 14 may be selectively used in any of the above units as the need arises.

Although the invention has been described by making detailed reference to a particular vertical general ledger sheets and bookkeeping units, such detail is to be understood in an instructive, rather than in any restrictive sense, many variants being possible within the scope of the claims hereunto appended.

I claim as my invention:

1. In a bookkeeping unit for a continuous up-to-date general ledger, a plurality of general ledger sheets, each sheet having a plurality of columns arranged in a section relating to a category selected from the group consisting of a category involving a year-to-date entries and a category involving current period entries, one of said columns being disposed at one side of the section and adapted to receive totals for said section, the sheets being arranged in overlapping relation one on top of the other and in laterally offset relation, the totals column of each sheet being disposed adjacent one side of the corresponding column of the underlying sheet to expose said columns, said totals columns being of the same width, each sheet having its upper margin provided with a plurality of equidistantly spaced apertures, means extending through said apertures to hold said sheets in alignment, the width of each sheet from one edge of the sheet to the edge of the totals column differing from the width of the corresponding portion of the adjacent underlying sheet, when the quotient of the division of the distance between the apertures into the width of said totals column is other than a whole number, by an amount equal to the remainder of such division for a number of successive sheets equal to the quotient in order to align the said totals columns in exposed side-by-side relation.

2. In a bookkeeping unit for a continuous up-to-date general ledger, a plurality of general ledger sheets, each sheet having a vertical center fold line, the sheet being provided at one side of said fold line with a plurality of columns arranged in a section relating to a category involving year-to-date entries, one of said columns being located immediately adjacent said fold line and being adapted to receive totals and balances for said section, the sheet being provided at the other side of said fold line with a plurality of columns arranged in a section relating to a category involving current accounting period entries, one of the last said columns being located immediately adjacent the side end of said sheet and being adapted to receive net changes for the current period section, each of said sheets being folded along the said center fold line, said sheets being arranged in overlapping relation one on top of the other and in laterally offset relation, the totals columns of the year-to-date sections being disposed in exposed side by side relation on one side of the unit, and the net change columns of the current period sections being disposed in adjacent exposed side by side relation on the opposite side of the unit, the width of the net change column of the current period section of each sheet at one side of the fold line is equal to the width of the totals column of the year-to-date section at the opposite side of the fold line.

3. In a bookkeeping unit for a continuous up-to-date general ledger, a plurality of general ledger sheets, one half of said sheets being provided with a plurality of columns arranged in a section relating to a category involving year-to-date entries, one of said columns being located adjacent one side end of the last said ledger sheets and being adapted to receive totals and balances for said section, the other half of said sheets being provided with a plurality of columns arranged in a section relating to a category involving current accounting period entries, one of the last said columns being located adjacent the corresponding side end of said sheets and being adapted to receive totals for the current period section, said sheets having the year-to-date section being arranged in back-to-back relation with the sheets having the current period sections, the sheets having the year-to-date sections being arranged in overlapping relation one on top of the other and in laterally offset relation, the totals columns of the year-to-date sections being disposed in adjacent exposed side by side relation on one side of the unit, the said sheets having the current period sections arranged in overlapping relation one on top of the other and in laterally offset relation, the totals columns of the current period sections being disposed in adjacent exposed side by side relation on the other side of the unit, the end total columns of the sheets arranged back-to-back being of the same width.

4. In a bookkeeping unit for a continuous up-to-date general ledger, a plurality of general ledger sheets, each sheet having a vertical center fold line and having a fold line laterally offset on each side of said center fold line, the sheet being provided at the outer side of one of said fold lines with a plurality of columns arranged in a section relating to a category involving current accounting period entries, one of the columns of said current period sections being disposed at the side end of said sheet and adapted to receive totals for said section, the sheet being provided between said offset fold lines with a plurality of additional columns arranged in a section relating to the same category involving current period entries, the sheet being provided at the outer side of the other offset fold line with a plurality of columns arranged in a section relating to a category involving year-to-date entries, one of the columns of said year-to-date section being disposed adjacent the last said offset fold line and adapted to receive totals for said year-to-date section, said sheet being folded forwardly along the center fold line and rearwardly along each of the offset fold lines so that the sheet portion between said offset fold lines is located between the sheet portions at the outerside of said offset fold lines, said sheets being arranged when folded in overlapping relation one on top of the other and in laterally offset relation, the totals columns of the year-to-date sections being disposed in adjacent exposed side by side relation on one side of the unit, and the totals columns of the current period sections being disposed in adjacent exposed side by side relation on the opposite side of the unit.

5. The combination and arrangement of elements as recited above in claim 4, but further characterized in that the width of each sheet from each side end to the closest offset fold line is equal, the width of the totals columns of the year-to-date section and the current period section are equal, and the width of the sheet between said offset fold lines is no greater than the width of the sheet from each adjacent fold line to the closest side end of said sheet.

6. In a bookkeeping unit for a continuous up-to-date general ledger, a general ledger sheet having a vertical fold line nearer one side end of the sheet than the other, the sheet portion of lesser width at one side of the fold line being provided with a plurality of columns arranged in a section relating to a category involving year-to-date entries, one of said columns being disposed adjacent the fold line and adapted to receive totals entries, the sheet portion at the other side of the fold line being provided with a plurality of columns arranged in a section relating to current accounting period entries, one of the last said columns being located adjacent the side end of the sheet, the sheet being provided with another vertical fold line in the current period section spaced from the first said fold line a distance at least as great as the width of the sheet portion of lesser width, the sheet being rearwardly folded along said fold lines so that the current period section overlaps the year-to-date section and so that the totals column of the current period section lies adjacent one edge of the totals column on the year-to-date section so as to expose the same for posting.

References Cited in the file of this patent

UNITED STATES PATENTS

| | | |
|---|---|---|
| 1,151,075 | Wellman | Aug. 24, 1915 |
| 2,061,675 | Schade | Nov. 24, 1936 |
| 2,083,601 | Haberfeld | June 15, 1937 |
| 2,678,046 | Segal | May 11, 1954 |
| 2,686,049 | Hollingsworth | Aug. 10, 1954 |

FOREIGN PATENTS

| | | |
|---|---|---|
| 607,428 | Great Britain | Aug. 31, 1948 |